United States Patent [19]

Guy, Jr.

[11] 3,873,773

[45] Mar. 25, 1975

[54] FORWARD BIT COUNT INTEGRITY DETECTION AND CORRECTION TECHNIQUE FOR ASYNCHRONOUS SYSTEMS

[75] Inventor: William V. Guy, Jr., Orlando, Fla.

[73] Assignee: Martin Marietta Corporation, New York, N.Y.

[22] Filed: Mar. 16, 1973

[21] Appl. No.: 341,823

Related U.S. Application Data

[63] Continuation-in-part of Ser. No. 192,131, Oct. 26, 1971, abandoned.

[52] U.S. Cl... 179/15 BA, 179/69.5 R, 340/146.1 D

[51] Int. Cl.............................................. H04j 3/06

[58] Field of Search....... 179/15 AF, 15 BA, 15 BV; 178/50, 69.5 R; 340/146.1 D

[56] References Cited

UNITED STATES PATENTS

| | | | |
|---|---|---|---|
| 3,136,861 | 6/1964 | Mayo | 179/15 AF |
| 3,504,287 | 3/1970 | Deregnaucourt | 179/15 AF |
| 3,569,631 | 3/1971 | Johannes | 179/15 AF |
| 3,596,245 | 7/1971 | Finnie | 340/146.1 D |
| 3,598,914 | 8/1971 | Synnott | 179/15 AF |
| 3,648,237 | 3/1972 | Frey | 340/146.1 D |

*Primary Examiner*—Kathleen H. Claffy
*Assistant Examiner*—Thomas D'Amico
*Attorney, Agent, or Firm*—Julian C. Renfro, Esq.; Gay Chin, Esq.

[57] ABSTRACT

Improved bit integrity is achieved for an asynchronous multiplex-demultiplex system of the type which employs means for transmitting a control code, such as a stuff code or a spill code, and for each transmitted control code providing one or more associated predetermined sequence time slots in the transmitted data stream. The transmitter employs circuitry for inserting into each of the associated sequence time slots, one of N known sequences respectively associated with K transmitted control codes. The control codes and bit patterns are received at a receiving terminal having circuitry for sequentially generating one of N known sequences in an exact same sequence as that inserted into the sequence time slots in response to successive detections of the received control codes. In addition, comparing means serves to compare each detected control code's associated N bit sequence with that generated in response to the detection of the control code and for providing an output misalignment indication when the sequences differ. Restoration of synchronization can thus be accomplished in an asynchronous multiplex system by ascertaining phase relation between the received sequence and the locally generated sequence, and then identifying the type of error that may be present, as well as the number of errors that may have occurred, so that in accordance with this invention, channel clock pulses can be added or deleted in order that synchronization can be restored.

33 Claims, 9 Drawing Figures

| FRAMES | MAJOR FRAME SYNC PATTERN | |
|---|---|---|
| 1 | CONTROL CODE | DATA |
| 2 | CONTROL CODE | DATA |
| 3 | CONTROL CODE | DATA |
| 4 | CONTROL CODE | DATA |
| 5 | CONTROL CODE | DATA |
| 6 | CONTROL CODE | DATA |
| 7 | CONTROL CODE | DATA |
| 8 | CONTROL CODE | DATA |
| 9 | CONTROL CODE | DATA |
| 10 | CONTROL CODE | DATA |
| : | CONTROL CODE | DATA |
| : | CONTROL CODE | DATA |
| K | CONTROL CODE | DATA |

FIG. 5

FORWARD BIT COUNT INTEGRITY DETECTION AND CORRECTION TECHNIQUE FOR ASYNCHRONOUS SYSTEMS

RELATION TO EARLIER INVENTION

This is a continuation-in-part of my copending application entitled "Bit Integrity Detection and Correction in an Asynchronous Multiplex System," filed Oct. 26, 1971, Ser. No. 192,131 now abandoned.

BACKGROUND OF THE INVENTION

This invention relates to the art of asynchronous multiplex-demultiplexer systems employing pulse stuffing and/or pulse spilling techniques to accommodate asynchronous data sources and, more particularly, to improvements in pulse stuff/spill code detection for such a system to maintain bit integrity between the input data and the demultiplexed output data.

The invention is particularly applicable for use in conjunction with an asynchronous time division multiplexing system (ATDM) and will be described with particular reference thereto; although it is to be appreciated that the invention has broader aspects and, for example, may be used with asynchronous digital combiners (ADC).

In an asynchronous time division multiplexing system, two or more independent data trains operating at individual asynchronous clock rates are multiplexed into a single high speed channel for transmission. As is known, multiplexing in such a system is accomplished by using a pulse stuffing/spilling technique to accommodate the asynchronous pulse trains. Pulse stuffing/spilling serves as a means of synchronizing the independent asynchronous pulse trains and provides that one or more dummy pulses be inserted into the transmitted data stream at discrete times to make up for small differences in pulse rates between an asynchronous data train and the multiplex sample rate. If the sample rate of the multiplexer is faster than the data rate, dummy data bit(s) are inserted in the data stream at a specific time, this being known as pulse stuffing. When the sample rate is slower than the data rate, one or more extra bits are transmitted in a particular time slot, or a special channel at a specific time, this being known as pulse spilling. The procedure in both cases is essentially the same. A stuff or spill code is transmitted prior to stuffing or spilling to inform the receiver that the transmission channel is stuffed or spilled. This may be accomplished by transmitting a multibit stuff/spill code in the time slot normally used for a frame synchronizing pattern and then detecting the stuff/spill code at the receiver. Upon detection of the stuff/spill code, the associated dummy bit or bits are removed from the data stream, or the extra bit(s) reinserted in the data stream.

To discuss the principle of pulse stuffing in somewhat more detail, input data from the asynchronous pulse trains are read into a temporary store, known as an elastic store, at the source rate. The data is read out of the elastic store at the sample rate of the multiplexer in order to effect synchronization of the various pulse sources. If the sample rate is faster than the source rate, then the elastic store would soon be depleted of information. Consequently, to maintain synchronization in the transmission of the data stream, the elastic store typically includes a status line to notify the multiplexer when thhe store of input data is running low. Action is then taken to inhibit the read out of data from the elastic store at a predetermined time slot, known as the dummy time slot, during which a false or stuff bit is inserted into the data stream. In the transmitted data stream, the data bits are grouped into frames, with each frame being preceded by a frame pattern. If a dummy bit time slot in a frame is to include a false or stuff bit, then a unique frame pattern, known as a stuff code, is transmitted. This alerts the receiving unit to disregard the stuff bit in the dummy bit time slot. Every frame does not necessarily include dummy or stuff bits in the dummy bit position, since this time slot is frequently used for information data. Consequently, it is exceedingly important that the receiving unit properly detect a stuff code and remove the stuff or dummy bit prior to routing the data stream to the appropriate receiver unit elastic store, so that when the information is read out of the elastic store there will be a retention of bit integrity; to wit, a one to one correspondence of input bits to output bits. Consequently, passing a stuff bit out of the demultiplexer as information data or removing an information data bit as a stuff bit are conditions of dire consequence to encrypted multiplexers.

As brought out by the above description, if an error is made in detecting a stuff code, or for that matter a spill code, then bit integrity will be lost. Consequently, multiplexing systems employing pulse stuffing are typically limited to a transmission path which includes a cable or a line-of-sight radio transmission path. The error environment over a cable or a line-of-sight radio path is distributed and if the stuff code is of sufficient length the probability of making an incorrect stuff or no stuff decision is low. If, however, such a system is employed in an error environment subject to Raleigh fading, such as a troposcatter link, the systems in accordance with the prior art would not operate satisfactorily.

Thus, burst errors may occur in transmission paths where Raleigh fading is prevalent and may result in an error rate approaching fifty percent and, hence, the probability of incorrectly detecting a stuff code may be high. The error may be a failure of the receiver unit to detect a stuff code or in falsely detecting a stuff code. In either case, once an error is made in detecting a stuff code synchronization is lost and a relatively long process of re-establishing synchronization must be executed. Consequently, it is desirable to determine if errors have occurred in detecting stuff codes, and, if so, re-establishing bit integrity.

It is known to utilize an analog approach to the problem of providing improved synchronization reliability. In the Mayo U.S. Pat. No. 3,136,861, for example, the patentee synchronizes a VCO with spill commands, with the output of the VCO being used to generate a window that will allow spill commands to be detected only during a specific period of time. If spill commands are not detected during this period, then a spill is automatically actuated, thus improving synchronization reliability to some extent.

In Mayo's system, the relation between the data rate and channel sample rate is limited by the dynamic range of the VCO. This is to say, the VCO cannot operate properly when the data rate is close to the channel sample rate, or much faster than the channel sample rate.

Also, in a noisy environment, the location of the aforementioned window cannot be known with any degree of accuracy, thus allowing errors to occur.

SUMMARY

The present invention involves a highly advantageous multiplex-demultiplex system utilizing pulse stuffing and pulse spilling techniques for a plurality of asynchronous pulse trains, such that channel data bits may be added or deleted as necessary to restore and maintain bit integrity in the system.

The system includes transmitter and receiver units, with the transmitter unit accommodating a plurality of asynchronous pulse trains, and having means for transmitting a control code for each channel of the system. The control code may be a stuff code, spill code or no-action code in respective dependence on whether the multiplex sample rate is faster, slower, or the same speed as the input data rate. For each transmitted control code, there is an associated sequence time slot in the transmitted data stream, and there are means for inserting into each of said associated sequence time slots, at least one bit of a known N bit sequence respectively associated with K transmitted control codes.

The system contemplates that the receiving unit receiving the transmitted data stream utilizes means for detecting each control code, and then removing the associated stuff bits from the data stream, or inserting spill bits in the data stream, as may be appropriate for establishing or re-establishing bit count integrity.

In more detail, each input channel of the multiplexer is provided with an N bit sequence generator, controlled by the control codes for that channel. In the receiver, the control codes and bit patterns are received, with a local sequence generator in each channel being controlled by the control commands for that channel. In other words, sequence generators in the transmitter and receiver are slaved to the command codes, with the extent of alignment between the transmitted and received sequences providing a relative count of the command codes transmitted. Inasmuch as the received sequence and the locally generated sequence may not always be in phase, means are provided in each channel for determining phase misalignment, with the direction of the misalignment indicating the type of error made, and the magnitude of the phase misalignment indicating the number of errors made. Channel data bits are then added or deleted as necessary to restore bit count integrity.

In accordance with a more limited aspect of the present invention, a determination is made as to whether the misalignment indication is indicative of an error in detecting a control code or is indicative of errors in the received sequence.

In accordance with a still further aspect of the present invention, when the misalignment indication is representative of an error in detecting a control code, a search is conducted to determine the type of error made in detecting the code, i.e., to ascertain whether the error was commited in falsely detecting a control code, or in failing to detect a control code.

In accordance with a still further aspect of the present invention, data bits are either inserted into or deleted from the received data stream in dependence upon the type of error made in detecting a control code, with a determination being made as to the number of errors made in detecting control codes.

It is therefore the primary object of the present invention to provide improved apparatus and method for use in an asynchronous multiplexing system, to reliably maintain bit integrity between the input data and the demultiplexed output data.

Another very important object of this invention is to provide apparatus and method for maintaining bit synchronization in a system wherein the data rate may be faster, slower, or interchangeably faster and slower than the channel sample rate.

A further object of the present invention is to provide improvements in such a multiplexing system for re-establishing bit integrity when an error is made in detecting a control code.

A still further object of the present invention is to provide improvements in an asynchronous multiplexing system employing pulse stuffing/spilling techniques so that the system may operate with bit integrity in an environment subject to Raleigh fading or any other type of transmission path that would be subject to burst errors.

A still further object of the present invention is to provide improved pulse stuffing/spilling techniques for asynchronous multiplexing systems, based on the principle of transmitting one or more bits of a known sequence each time a control code is transmitted for purposes of providing the receiver with a record of the number of stuffs or spills that have occurred.

BRIEF DESCRIPTION OF THE DRAWINGS

The foregoing and other objects, features and advantages of the invention will become more readily apparent from the following description of the preferred embodiment of the invention, taken in conjunction with the accompanying drawings which are a part hereof, and wherein:

FIG. 5 illustrates a major frame for an asynchronous multiplexer in accordance with this invention;

DETAILED DESCRIPTION

Introduction

Figures 1, 2:
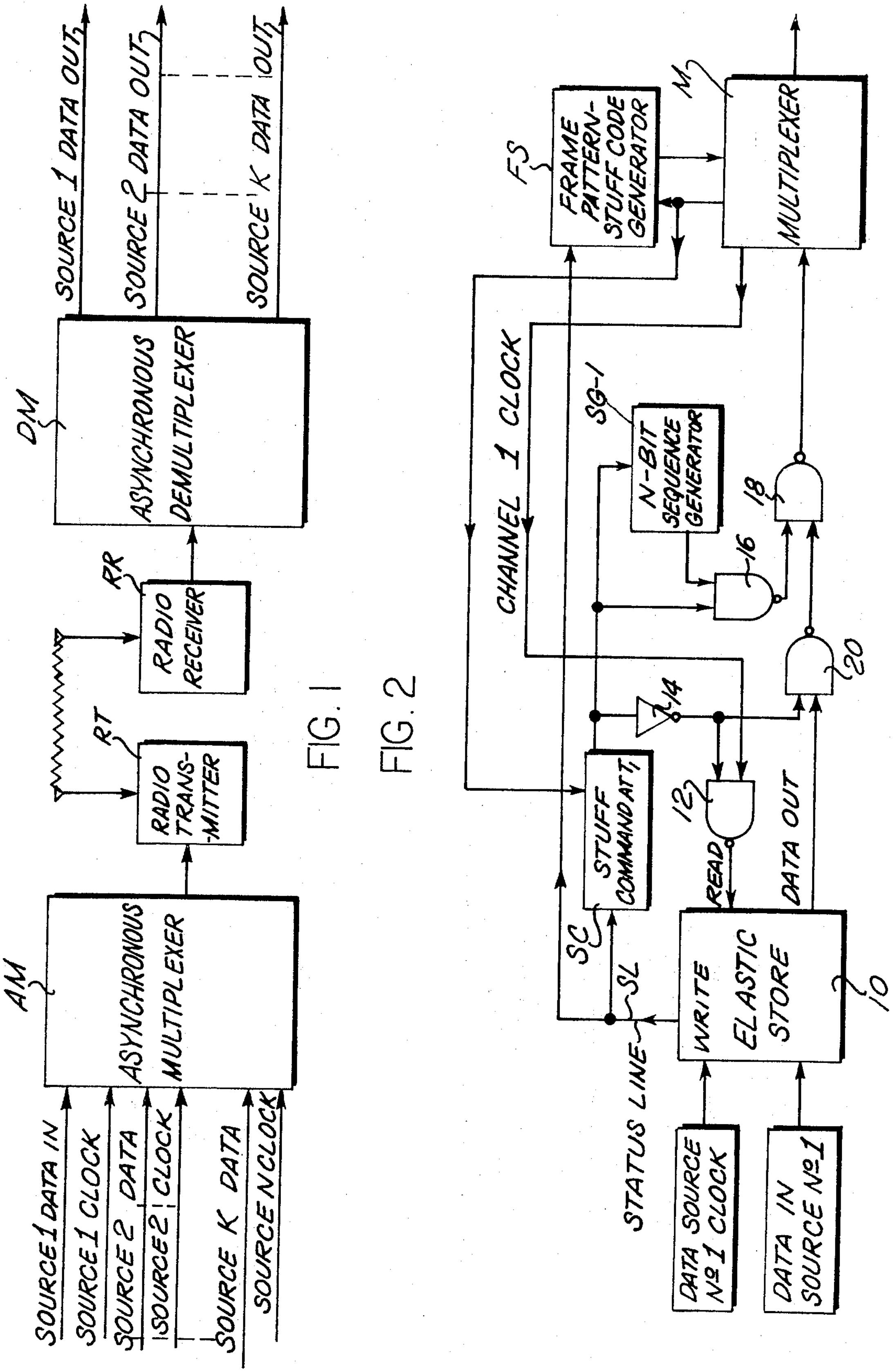
FIG. 1 is a block diagram illustration of an asynchronous multiplexer-demultiplexer system to which the present invention may be applied.
FIG. 2 is a combined schematic-block diagram illustration of the invention as applied to the transmitter terminal for each channel of an asynchronous multiplexer-demultiplexer system.

Referring now to the drawings wherein the showings are for purposes of illustrating the preferred embodiment of the invention only and not for purposes of limiting same, FIG. 1 generally illustrates an asynchronous multiplexer-demultiplexer system to which the present invention may be applied. Briefly, in such a system an asynchronous multiplexer AM may be employed to multiplex a plurality of independent asynchronous data trains from sources 1, 2 through K into a single high speed channel for transmission, as with a radio transmitter RT. The information data from this plurality of sources is written into individually associated elastic stores in the asynchronous multiplexer at the respective asynchronous rates. Multiplexing is accomplished by using a pulse stuffing technique to accommodate the asynchronous channel.

The data stream received by the radio receiver RR is demultiplexed by an asynchronous demultiplexer DM so as to provide output information data for sources 1, 2 through K at the same respective asynchronous rates that the data was received by the asynchronous multiplexer AM. The asynchronous demultiplexer must reliably discriminate between normal information data in the data stream and the extraneous data, such as stuff bits and order wire bits.

Transmitter Terminal

Reference is now made to FIG. 2 which illustrates the circuitry employed for each transmission channel at the transmitter terminal of the multiplexer-demultiplexer system. But for the exceptions to be pointed out, the circuitry shown in FIG. 2 is conventional in the art. Thus, such a terminal typically includes for each transmission channel, an elastic store 10 which receives data from a data source, such as source No. 1, with the data being written into the elastic store at the asynchronous rate of the source controlled by, for example, clock pulses taken from the data source No. 1 clock and applied to the write terminal of the elastic store. The data stored in elastic store 10 is read out at a rate determined by a multiplexer clock. Thus, a multiplexer M, which is associated with all of the transmission channels, provides multiplex clock pulses for reading the data out of each elastic store. In the example illustrated, multiplexer M provides channel 1 sample clock pulses which are applied to the read terminal of the elastic store 10 through a normally enabled inhibit gate 12. For each clock pulse applied to the read terminal of elastic store by inhibit gate 12, a data bit is retrieved from the elastic store output terminal and applied to the multiplexer. Inhibit gate 12 is disabled during a stuffing operation, during which either a dummy bit or no bit whatsoever is applied to the multiplexer M.

For purposes of simplifying the description of the invention herein, the circuitry in FIG. 2 represents that which would be employed in a system wherein the data source rate is less than the sample clock rate. Conventionally in such a system, the elastic store, such as store 10, is provided with a status line SL which serves to provide an indication representative that the data in the elastic store is running low (due to the fact that data is being read out of the store faster than it is being written into the store). This indication on the status line SL may be considered as a binary 1 signal which serves to actuate a frame pattern-stuff code generator FS, as well as a stuff command pulse generator SC.

The frame pattern-stuff code generator FS is associated with channel 1 in the example given, and, as is conventional, is interrogated at specific times by the multiplexer and provides to the multiplexer a frame-pattern to be inserted in the pulse stream. The frame-pattern may be a multibit pattern of, for example, seven bits. The data stream is broken into frames, with each frame including a frame-pattern for a specific channel, such as channel 1, followed by the information data bits for that channel. However, whenever the status line SL carries an indication that the elastic store is running low, a command signal is applied to the frame pattern-stuff code generator FS so that when the multiplexer M next interrogates generator FS a different pattern, known as a stuff code, is inserted into the data stream. This stuff code, for example, may merely be the complement of the normal frame-pattern. When such a stuff code is inserted into the data stream, it is indicative that at a specific time slot in the frame, stuffing will occur. This specific time slot which follows the frame-pattern by a time period $T_1$ will be referred to interchangeably herein as either the dummy bit time slot or the stuff bit time slot. It is during this time slot that inhibit gate 12 is disabled so as to prevent data from being read out of the elastic store 10.

The stuff command pulse generator SC serves to provide a stuff command pulse at time $T_1$ after the multiplexer has interrogated the frame pattern-stuff code generator FS. This stuff command signal, which may be considered as a binary 1 signal, is inverted by an inverter amplifier 14 so that a disabling binary 0 signal is applied to one input of the inhibit gate 12. Since inhibit gate 12 is a NAND gate, a binary 0 signal applied to one of its input serves to inhibit the gate so that its output circuit carries a binary 0 signal regardless of the binary level of the channel 1 sample clock signal applied to the second input of the gate. Unless otherwise specified herein, all of the logic gates to be described are NAND gates.

The description given thus far has essentially been with respect to the conventional circuitry employed for each transmission channel in a multiplex-demultiplexer system. An example in the prior art of such a system is found in the U.S. patent to J. S. Mayo, U.S. Pat. No. 3,136,861, to which reference may be made for purposes of obtaining a greater understanding of the circuitry described to this point.

The Mayo patent, entitled "PCM Network Synchronization," pertains to a system in which the channel sample rate is slower than the data rate. It provides a means for inserting excess data at a specific time in a variable time slot reserved for spill or excess data.

Mayo provides one time slot to indicate if a spill is to occur, and another time slot to contain the spill data bit. If a marking pulse occurs in the first of these slots, then an extra data bit will be inserted in the next time slot. As previously mentioned, Mayo's system cannot operate properly when the channel sample rate either is close to the data rate, or else is much faster than the data rate. This is because he uses a VCO at the receiver that is driven by the detected spills, and the dynamic range of a VCO is such that it cannot be accurately driven over wide variations of channel sample rate to data rate. In an environment subject to burst errors, Mayo's technique by itself will not provide sufficient protection against loss of bit count integrity.

In Mayo, the VCO is used to allow spills to occur only during a specified time inasmuch as it is driven such that spills can only occur during a certain time frame or window. In accordance with that analog approach, only when the frame or window is open can spills occur. In a noisy environment, the location of this open frame cannot be known with any degree of accuracy, thus allowing errors to occur.

By way of contrast, in accordance with the instant invention, I provide for the transmission of a sequence at the transmitting terminal, with the phase of the transmitted sequence being controlled by the arrival of stuff, spill or no-action commands. As will be discussed in detail hereinafter, this arrangement makes possible a digital technique for ascertaining at the receiver the exact number of stuff, spill or no action commands transmitted. Significantly, the rate of stuffs or spills does not affect the accuracy of my system, for the channel sample rate can either be close to or else much faster than the data rate. Significantly, I can provide for return of bit synchronization even in a burst error environment.

The transmitting terminal for each channel includes apparatus for inserting bit patterns into the dummy bit time slots during the stuffing operations. The bit patterns are sequentially generated in response to successive stuff commands, with the plurality of bit patterns being respectively associated with a like plurality of transmitted stuff codes. The purpose of the bit patterns is to provide the receiver terminal with a record of the number of stuffs that have occurred in the transmission channel. Thus, if 9 stuff codes be transmitted, then 9 bit patterns are also transmitted in the respectively associated dummy bit time slots. The bit patterns to be inserted in the dummy time slots constitute a known digital sequence, and this may be accomplished in various ways. For example, one bit of the known sequence may be transmitted for each transmitted stuff code. Alternatively, the entire sequence may be transmitted each time a stuff code is transmitted, with the phase of the sequence being shifted one bit with successive transmitted stuff codes. Also, a portion of the sequence may be transmitted each time a stuff code is transmitted, with the partial sequence being shifted one bit each time a stuff occurs.

The number of bits transmitted in the dummy bit time slot for an associated stuff code is determined by the time to reacquire bit count integrity. The principle of re-establishing bit count integrity, however, is the same if one bit or all of the bits of the sequence are transmitted. Consequently, for purposes of simplifying the description of the invention herein, only one bit of an N bit known digital sequence is transmitted each time a stuff occurs. Also, it will be assumed that the channel sample rate is faster than the incoming data rate and, hence, dummy data bits are added to the data stream to synchronize the input data bits with the channel sample clock. The code employed for the sequence generator may be considered as a 15 bit code with K sequence generators being provided, one for each input channel.

Reference is again made to FIG. 2 wherein, in accordance with the present invention, an N bit sequence generator is employed at the transmitting terminal for each transmission channel. In the circuitry shown for channel 1, the transmitting terminal includes N bit sequence generator SG-1. This sequence generator serves to sequentially generate one bit of an N bit known digital sequence in response to successive stuff commands. As stated hereinbefore, this sequence may include 15 bits. Each time the sequence generator is actuated by a stuff command signal, the generator provides one bit of the N bit sequence to be inserted in the dummy bit position in the data stream and the generator is clocked forward by one bit in preparation for the next stuffing operation. Each stuff command, which may be considered as a binary 1 signal, also serves to enable a NAND gate 16 so that the output bits from sequence generator SG-1 may be routed to the multiplexer M.

The output signals from the NAND gate 16 are applied to a second NAND gate 18 for application to the multiplexer M. NAND gate 18 is normally enabled by a binary 1 signal from NAND gate 16 during the normal data stream transmission operation. This is also true of another NAND gate 20 connected to the data output terminal of the elastic store 10. That is, NAND gate 20 is normally enabled by a binary 1 signal taken from the output of inverter amplifier 14 during the data transmission operation. Consequently, during the normal data transmission operation, the bits taken from the data output terminal of the elastic store are routed through gates 20 and 18 to the multiplexer M. However, during a stuffing operation, a stuff command signal is inverted by the inverter amplifier 14 to apply a binary 0 or disabling signal to NAND gate 20. Consequently, NAND gate 20 will, during the stuffing operation, apply an enabling binary 1 signal to NAND gate 18 so that the generated bit from the sequence generator SG-1 may be routed through gates 16 and 18 to the multiplexer M during the dummy bit time slot.

Receiving Terminal

Figure 3:
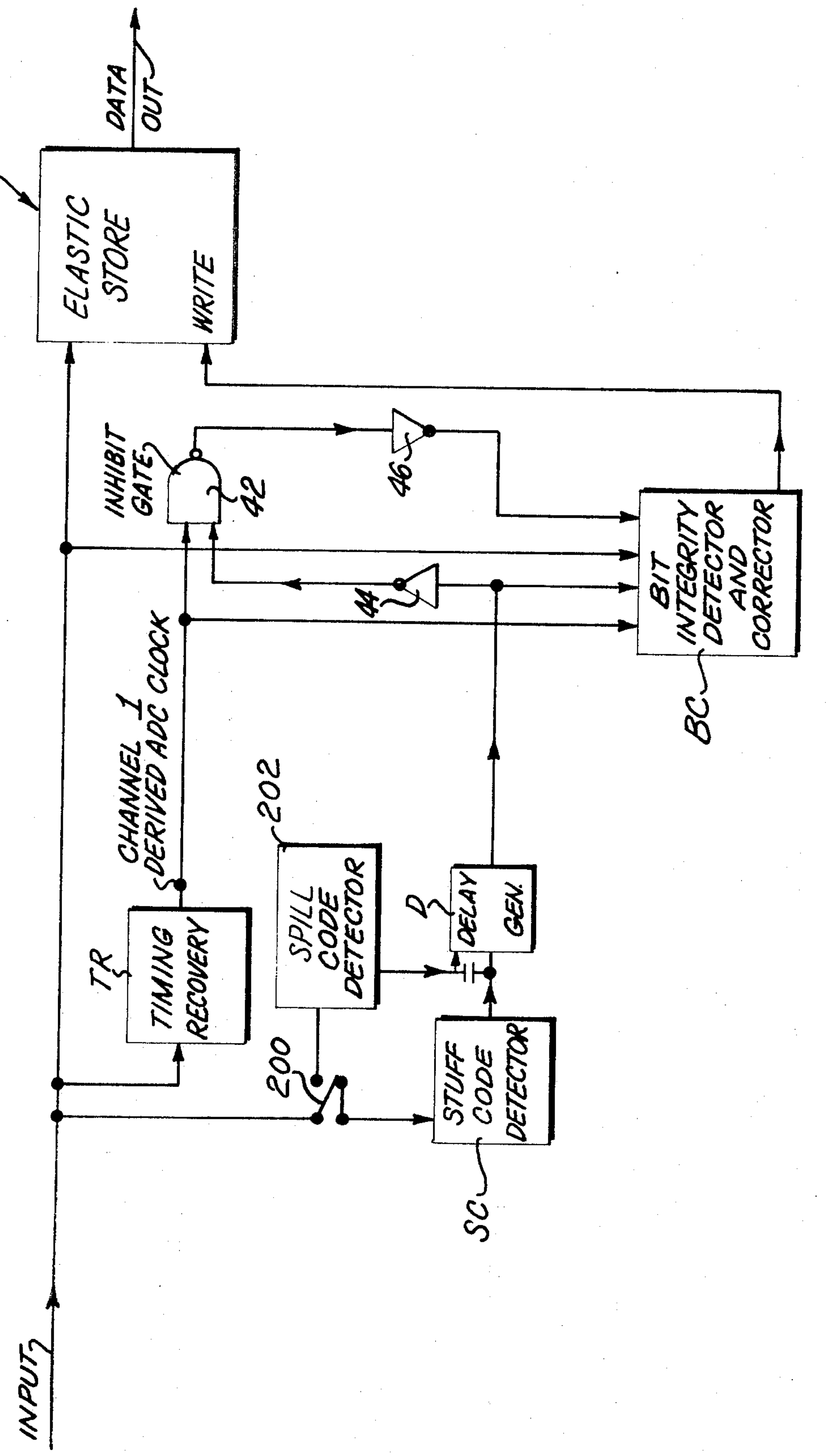
FIG. 3 is a combined schematic-block diagram illustration of the invention as applied to the receiver terminal for each channel of an asynchronous multiplexer-demultiplexer system.

Reference is now made to FIG. 3 which generally illustrates the circuitry employed at the receiving terminal for each transmission channel in a conventional asynchronous multiplexer-demultiplexer system, together with the improvements in accordance with the present invention. Typically, the receiving terminal for each channel includes an elastic store 40 which receives data at a rate determined by clock pulses applied to the write terminal thereof in accordance with demultiplexer clock signals. These clock signals may be derived as with a conventional timing recovery circuit TR which serves to derive a clock rate from the incoming data stream. The clock signals taken from the timing recovery circuit TR will be referred to herein as the derived ADC clock pulses. Each time such an ADC clock pulse is applied to the write terminal of elastic store 40, a data bit is written into the elastic store. Since the elastic store serves to provide output data having bit integrity with the data source at the transmitting terminal, such as data source No. 1, it is necessary that the ADC clock pulses be inhibited at certain times to prevent the frame-pattern and stuff-pattern from being written into the elastic store. Consequently, it is conventional that the ADC clock pulses from the timing recovery circuit be routed through a normally enabled inhibit gate 42 prior to being applied to the write terminal of elastic store 40. The inhibit gate 42 is disabled on command to prevent ADC clock pulses from being routed to the write terminal when the data stream includes a stuff-pattern. A stuff code detector SC serves to detect a stuff code and apply a binary 1 signal to a delay generator D. Since the transmitter terminal for channel 1 provides a dummy time slot at time $T_1$ after transmission of a stuff code, any information contained in the dummy time slot should be inhibited and not applied to the elastic store (keeping in mind that the description herein is given with respect to a system wherein the channel sample rate is faster than the source input rate). For this reason the delay pulse generator D responds to a detection by the stuff code detector SC to provide an output pulse delayed by time $T_1$, with this pulse taking the form of a binary 1 pulse. This delayed pulse is applied to invertor gate 44 for disabling inhibit gate 42 during the dummy time slot associated with the detected stuff code. The derived ADC channel 1 clock is generated in the timing recovery circuit which provides clock pulses only during channel 1 sample. No clock pulses are generated during framing or when channels 2 through K samples occur.

In FIG. 3, a switch 200 is illustrated interposed between the Input and the two detectors, the Stuff Code Detector SC, and the Spill Code Detector 202. This of course makes it possible to isolate one of the other of these detectors so that the other one can be utilized. For example, if the data rate is always slower than the sample rate, the Stuff Code Detector SC is to be utilized, whereas if the data rate is always faster than the sample rate, the Spill Code Detector 202 is to be utilized. If the data rate is interchangeably slower or faster, such as can be the case in accordance with this invention, both detectors can be connected, and the switch 200 eliminated, so that each of the above mentioned detectors can receive the input at all times.

In the description given thus far it may be considered that the output of inhibit gate 42 is inverted and connected to the write terminal of the elastic store 40. This would be typical of the receiving terminal for each channel in a conventional multiplex-demultiplexing system. As will be noted however from FIG. 3, the output of Inhibit Gate 42 is routed via inverter 46 to a Bit Integrity Detector and Corrector Circuit BC, having its output applied to the write terminal of the Elastic Store 40. Circuit BC, to be discussed in detail hereinafter with reference to FIGS. 4A and 4B, also includes an input to receive stuff clock pulses as delayed by Delay Circuit D, an input to receive the derived ADC clock pulses from the Timing Recovery circuit TR, and an input for receiving the data stream as applied to the input terminal of the circuitry shown in FIG. 3.

Bit Integrity Detector and Corrector Circuit

Figure 4A:
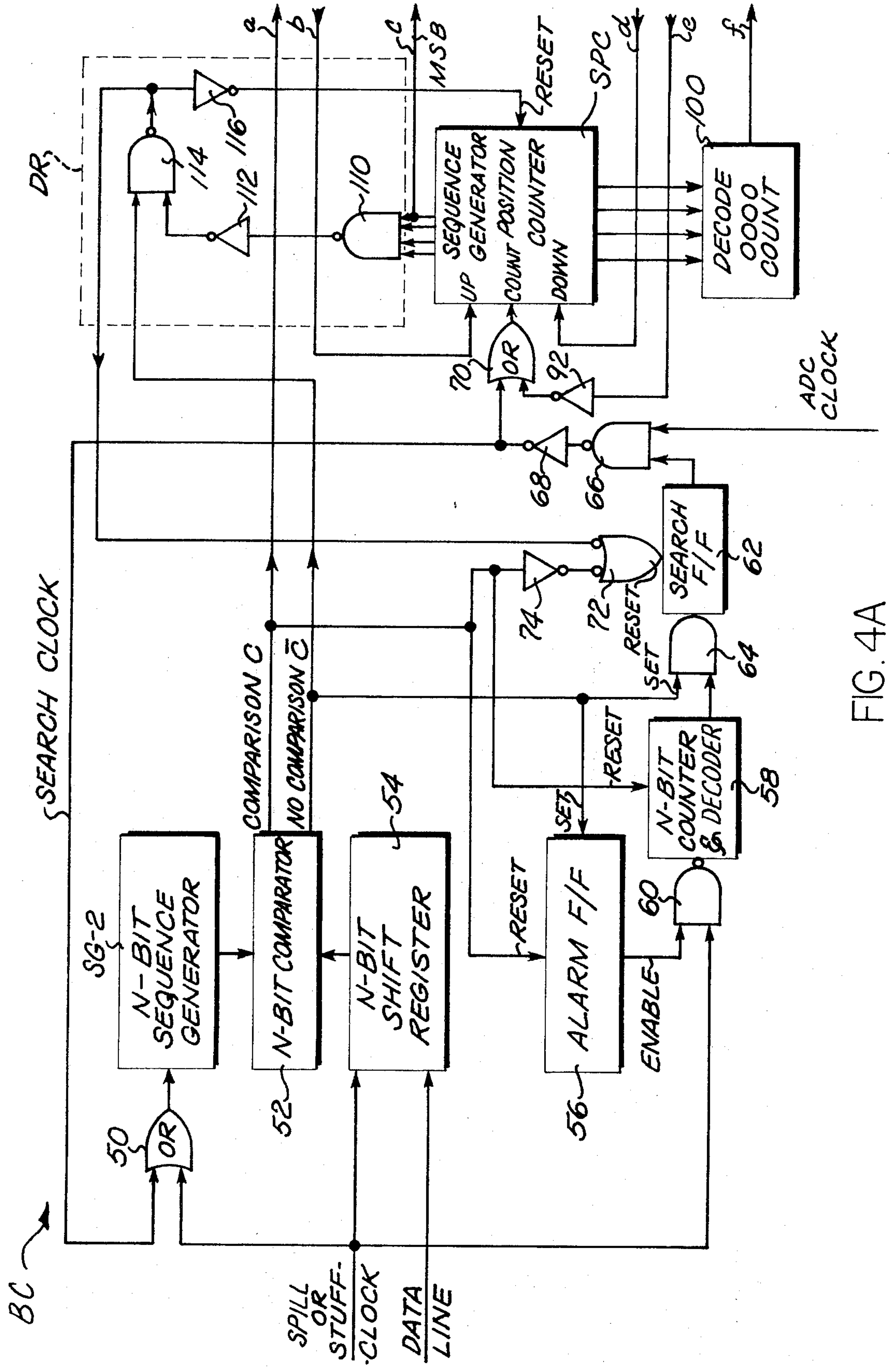
FIGS. 4A and 4B, taken together, are a more detailed schematic-block diagram illustration of the Bit Integrity Detector and Corrector Circuitry in accordance with this invention, as generally shown in FIG. 3.
Figure 4B:
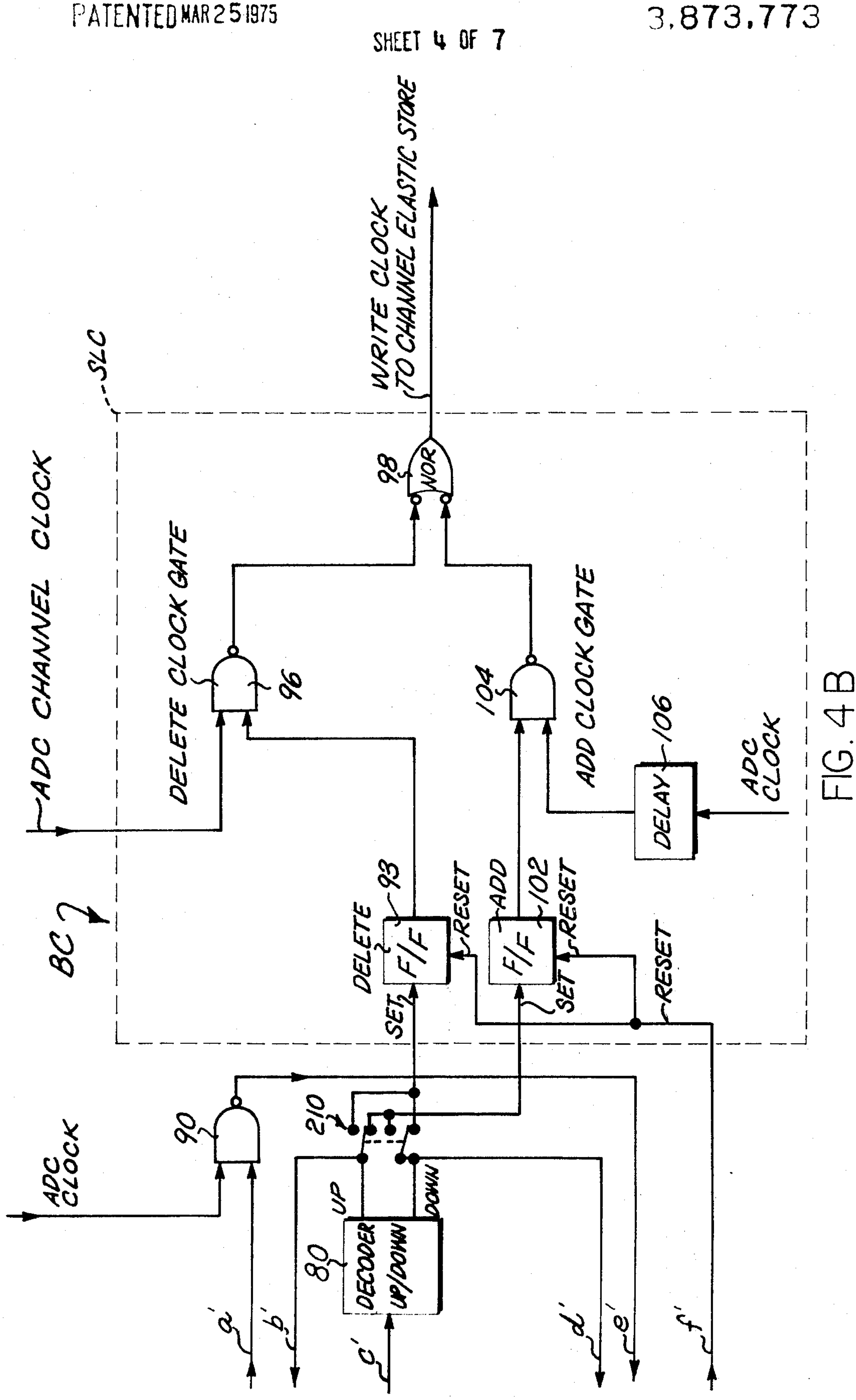

In accordance with the present invention, the receiving terminal for each transmission channel includes a Bit Integrity Detector and Corrector Circuit BC taking the form as shown in related FIGS. 4A and 4B. A brief general description of this circuit will now be given, followed by a detailed description. The Bit Integrity Detector and Corrector Circuit serves to determine whether any errors have occurred in detecting stuff codes. If such an error is made, then there will be a loss of bit integrity in the data stream. Circuit BC serves to detect such an error and to either add or delete data bits to the data stream applied to elastic store 40 to attain bit integrity. The cause of such an error in detecting a stuff code may be the result of using the multiplex-demultiplexing system in the transmission path subject to Raleigh fading or any other type of path that would be subject to burst errors. Advantageously, circuit BC determines whether the error in detecting a stuff code was in falsely detecting a stuff code, or by a failure to detect a stuff code.

To accomplish these objectives, the Bit Integrity Detector and Corrector Circuit BC includes an N bit Sequence Generator SG-2 which responds to successive actuations to generate an exact same sequence of bit patterns as that generated by Sequence Generator SG-1 in the transmitting terminal illustrated in FIG. 2. Each time a stuff code is detected by the Stuff Code Detector SC (see FIG. 3), a delayed stuff clock pulse is applied through an OR gate 50 to actuate the Sequence Generator SG-2 to generate a bit pattern. As described hereinbefore with respect to the transmitting terminal, the bit pattern in the example described herein is one bit of an N bit known digital sequence. The generated bit is applied to an N Bit Comparator 52. In response to each stuff clock pulse, an N Bit Shift Register 54 receives recovered data from the data stream applied to the receiver input. This recovered or stuff data is the bit inserted into the dummy bit time slot by the N Bit Sequence Generator SG-1 at the transmitting terminal. The stuff data bits are entered serially into the N Bit Shift Register 54 under the control of the stuff clock pulses. In this manner, the receiver is provided with a continuous record of the number of stuffs that have occurred.

When the received sequence and generated sequence are in phase, the number of stuff commands transmitted equals the number of stuff commands received. When, however, the received sequence and the generated sequence are not in phase, the phase misalignment reveals the number and type of stuff errors made.

The received sequence bit pattern, as applied to Shift Register 54, is compared with the generated sequence bit pattern from Sequence Generator SG-2 by means of the N Bit Comparator 52. If the two patterns are aligned, then no action is taken. However, when they are not aligned, then the Comparator 52 provides a No Comparsion Signal $\overline{C}$, which may take the form, for example, of a binary 1 signal. The No Comparison signal is applied to the set terminal of an Alarm flip-flop 56 so that its output circuit carries an enabling binary 1 signal to enable an N Bit Counter and Decoding circuit 58 to commence counting the next N stuff operations, as represented by N successive stuff clock pulses. The N Bit Counter and Decoder 58 may take the form of a conventional 15 bit digital counter where N represents the decimal number 15 so that upon counting 15 stuff clock pulses its output circuit will carry a binary 1 signal. The input to the Counter and Decoder 58 includes a NAND gate 60 which is enabled by the binary 1 signal obtained when the Alarm flip-flop 56 is set by the No Comparison signal $\overline{C}$.

The purpose in counting the next N stuff operations upon a no comparison detection is to clear the N bit shift register of possible errors. It should be mentioned that in a system in which greater than 50 percent of the entire sequence was transmitted, the N bit counter would not be required. If, after counting N stuff operations, there is still a No Comparison signal $\overline{C}$ from Comparator 52, then an error was made in detecting a stuff code. If at the end of N counts, the Comparator 52 indicates that the generated sequence from Generator SG-2 is aligned with the received sequence in Register 54, then Comparator 52 provides a Comparison Signal C, which may take the form of a binary 1 signal. The Comparison Signal C is applied to reset the Alarm flip-flop 56 and to reset the N Bit Counter and Decoder 58 to its zero count condition.

If, however, a No Comparison signal $\overline{C}$ is still provided by Comparator 52 after N counts, then a search is conducted to determine the type and number of stuff code errors that have been made. This is accomplished by setting Search flip-flop 62 with the output pulse obtained when Counter 58 has counted out and with the No Comparison signal $\overline{C}$. The Search flip flop 62 has its input provided with an AND gate 64 for this function. Once the Search flip-flop is set, its output circuit provides an enabling binary 1 signal which is applied to one input of a NAND gate 66 to enable clock pulses, such as the derived ADC clock pulses from the Timing Recovery circuit (see FIG. 3), to be routed through the NAND gate and applied to a Sequence Generator Position Counter SPC, as shown in FIG. 4A. As will be developed in greater detail hereinafter, this counter will count up to a maximum of N clock pulses or until a Comparison signal C is provided by Comparator 52. The count obtained by Counter SPC is indicative of the type and number of errors made in detecting stuff codes. The derived ADC clock pulses routed through NAND gate 66 are inverted by a suitable inverting amplifier 68 and applied through OR gate 50 to sequentially actuate the N Bit Sequence Generator SG-2. Consequently, these pulses applied to the N Bit Sequence Generator SG-2 serve the same function as the stuff clock pulses, in that for each pulse the generator is clocked forward by one bit and one bit of the sequence is applied to the N Bit Comparator 52. This clocking operation of the Sequence Generator SG-2 will continue until Comparator 52 provides a Comparison signal C or until N of the derived ADC clock pulses have been counted by Counter SPC.

The Sequence Generator Position Counter SPC preferably takes the form of a conventional up-down counter and is configured so as to normally count upward for each pulse applied to its Count input terminal. The derived ADC clock pulses routed through NAND gate 66 and inverted by inverter amplifier 68 are also applied to the Count Input terminal of Counter SPC through an OR gate 70. Once a comparison is reached between the bit pattern in Register 54 and that generated by Generator SG-2 in response to the search clock pulses, a Comparison C signal is developed by Comparator 52. This Comparison signal C serves to reset Alarm flip-flop 56, the N Bit Counter and Decoder 58, and the Search flip-flop 62. Search flip-flop 62 is provided with an inverted OR input gate 72 at its reset terminal. Reset is accomplished by applying the Comparison signal C through an inverter amplifier 74 to one input of the inverted OR gate 72.

In an alignment between the two patterns is attained during the search, then NAND gate 66 is disabled to prevent further ADC clock pulses from being applied to Counter SPC. The count attained by the Counter indicates the type and number of stuff errors made. In the example being described, N equals 15. If the count attained by Counter SPC is 7 or less, then the number of the count is indicative of the number of errors made, and the fact that the count is equal to or less than 7 is indicative that false no stuff decisions were made. That is, the receiving terminal failed to detect a stuff code(s). Consequently, in order to attain bit integrity. data bit(s) must be deleted from the pulse stream before being applied to the Elastic Store 40 of FIG. 3. If each stuff operation includes a single bit one bit of the known N bit sequence) inserted by the Sequence Generator SG-1, FIG. 2), then for each count one data bit must be deleted. Conversely, if the count attained by Counter SPC is 8 or more, then this count is indicative of the number of false stuff decisions that have been made. A false stuff decision is made when, for example, the Stuff Detector SC of FIG. 3 falsely detects a bit pattern as being a stuff code. This erroneously inhibits an information data bit from being written into the Elastic Store 40. Consequently, in order to obtain bit integrity in the data stream, one bit for each such error must be added to the data stream applied to the Elastic Store 40. These functions of deleting or adding data bits in the data stream are accomplished by means of the Stuff Correction Logic circuit SLG contained within the dashed lines of FIG. 4B

In order to determine whether the count attained by counter SPC of FIG. 4A is 7 or less, or whether it is 8 or more, a Decoder 80 is provided as shown in FIG. 4B for detecting the most significant bit (MSB) on the output circuits of counter SPC. Lead *c* out of SPC may be regarded as connecting to lead *c'* forming an input to Decoder 80. Thus, counter SPC conventionally includes four output circuits which are weighted in binary notation so as to have decimal values of 1, 2, 4 and 8. The output circuit having a decimal value of 8 is considered as the most significant bit line and, consequently, monitoring this line by means of the aforementioned connection for the presence of a binary 1 signal will provide an indication as to whether the count of counter SPC is 8 or greater. This is the function of the up-down Decoder 80 and it is provided with an up output and a down output for respectively carrying command signals, such as binary 1 signals, if the count is at least 8 or is 7 or less. If the count is 7 or less, then the Down output terminal of Decoder 80 actuates the Down input terminal of Counter SPC so that when pulses are applied to the Count Input terminal of this counter, it will count downward or backward toward a 0000 count. Conversely, if the Up output terminal of Decoder 80 be provided with a bianry 1 signal output, then this signal will actuate the Up input terminal of Counter SPC so that the counter will count up to a decimal count of 15, a binary pattern of 1111. Each time the Counter SPC is counted down one step, a data bit is deleted from the pulse stream applied to Elastic Store 40 (FIG. 3), and, conversely, each time the Counter SPC is counted upward one step, a data bit is added to the pulse stream applied to Elastic Store 40.

The count down or count up operation of Counter SPC is accomplished in response to a comparison being reached between the bit pattern generated by Generator SG-2 (FIG. 4A) in response to a search clock pulse and the bit pattern stored in the N bit shift register 54. When such a comparison is reached, a Comparison signal C is applied to enable a NAND gate 90 (FIG. 4B) so that ADC clock pulses may be routed through the NAND gate and then inverted by an inverter amplifier 92 (FIG. 4A) and applied through OR gate 70 to the Count Input terminal of the Counter SPC. As to whether this counter counts up or down is dependent upon whether the up terminal or down terminal of the counter has been actuated by Decoder 80.

Assume for the moment that on the first count of Counter SPC a comparison is reached at Comparator 52 during the assumed condition in which the data rate is slower than the sample rate. This is indicative of one falso no action decision having been made at the receiving terminal. Consequently, one data bit must be deleted from the data stream applied to Elastic Store 40. The Down terminal of Decoder 80 actuates Counter SPC to count downward in response to ADC clock pulses routed through NAND gate 90. Since the Down output of Decoder 80 is actuated, a binary 1 signal is applied to set a Delete flip-flop 93 in the Stuff Correction Logic Circuit SLC of FIG. 4B. When this flip-flop is set, its output circuit carries a binary 0 signal so that a disabling signal is applied to one input of a normally enabled Delete Clock Gate 96. The other input to Gate 96 receives the derived ADC clock pulses from FIG. 3, which ADC clock pulses are normally applied through the normally enabled Delete Clock gate 96 as well as through a following NOR gate 98 to the Write terminal of Elastic Store 40; note FIG. 3. However, one ADC clock pulse is inhibited for each count or Counter SPC during the count down function so as to inhibit one data bit from being written into the elastic store. Consequently, when the Delete flip-flop 93 disables the Delete clock gate 96, ADC clock pulses applied to the gate are inhibited, and this condition continues until Counter SPC counts down to a zero count. This condition is noted by means of a binary level 0000 Decoder 100 (FIG. 4A) which monitors the output circuits of Counter SPC and, upon detecting a zero count, it applies a binary 1 signal to reset Delete flip-flop 93. Bit integrity should now be restored to the data stream written into the Elastic Store 40.

If, however, the count on Counter SPC in the above example was 8 or more when a comparison is reached at Comparator 52, then the Counter will be sequentially actuated to count up to 15. Each time the Counter is actuated, a data bit is added to the data stream to be applied to Elastic Store 40. This is accomplished by using the Up output terminal of Decoder 80 to apply a binary 1 signal to set an Add flip-flop 102. When this flip-flop is set, its output circuit carries a binary 1 signal to enable a normally disabled Add-inhibit gate 104. When this gate is enabled it permits delayed ADC clock pulses to be intermixed with the ADC clock pulses applied to the write terminal of elastic store 40. The ADC clock pulses are derived by the Timing Recovery circuit TR (FIG. 3), are slightly delayed with a Delay circuit 106 and these delayed clock pulses are applied through the Add-inhibit gate 104, as indicated in FIG. 4B. Consequently, each time the Counter SPC is counted upward one delayed ADC clock pulse is intermixed or added to the train of ADC clock pulses applied to Elastic Store 40. The Add flip-flop 102 performs this function as Counter SPC counts up to a decimal count of 15 and resets to a count of 0000, which is decoded by Decoder 100 to reset Add flip-flop 102.

The preceding discussion assumed the Counter SPC reached a count either of 7 or less, or more than 8 and a Comparison signal C is provided. However, if the counter continues to count until it attains a decimal count of 15 and no Comparison signal C is provided, then the Search flip-flop 62 of FIG. 4A and the Sequence Generator Position Counter SPC are reset until the next stuff operation occurs and alignment is rechecked. The process is performed until alignment between the two sequences occurs. These functions are controlled by a Decode and Reset circuit DR; see FIG. 4A. This circuit includes a NAND gate 110 that is connected to the four output circuits of the Position Counter SPC so that when the counter reaches a total decimal count of 15, each circuit applies a binary 1 signal to the NAND gate and its output will then carry a binary 0 signal. This binary 0 signal is inverted by an inverted amplifier 112 so as to apply an enabling binary 1 signal to another NAND gate 114. At this time, there is no comparison at the Comparator 52 and a No Comparison signal $\overline{C}$ is provided, causing the NAND gate 114 to provide a binary 0 output signal. This signal is inverted by an inverter amplifier 116 and applied to the Reset terminal of Counter SPC so that this counter is reset to a zero count. In addition, the binary 0 signal taken from the output of inverter amplifier 114 is applied to one input of the inverted OR gate 72 to reset the Search flip-flop 62. The circuitry is now conditioned to perform a new cycle of operation when the next stuff operation occurs.

The description presented thus far has been with respect to an asynchronous multiplex-demultiplexing system wherein the source rate is less than the multiplex sample clock rate. It is for this reason that during a stuffing operation, at least one bit is inserted in the dummy bit time slot to artificially obtain synchronization. It is most significant to note, however, that my invention is also applicable to a system wherein the data source clock rate is greater than the multiplex sample clock rate, or to a system wherein the clock rate is alternately greater and less than the data rate.

As is conventional, when the data rate is greater than the sample clock rate the extra data bits are transmitted in a separate channel. With reference to the embodiment described herein, data bits are transmitted in channel 1 and the extra data bits, when the data rate is greater than the sample clock rate, are transmitted in a different channel. Whenever an extra data bit is placed in a separate channel, a spill code is transmitted in channel 1, alerting the receiver that a spill has occurred. This extra data bit must be added to the data stream applied to the Elastic Store 40.

In applying the present invention to such a system wherein the data rate is greater than the sample clock rate, the transmission of the N bit sequence is reversed, in that the sequence is tranmsitted when spilling does not occur. Consequently, with respect to channel 1, a no spill pattern is transmitted in the frame pattern time slot. If desired, the no spill pattern may be the same as the frame pattern if the spill code is the complement of the frame pattern. Each time such a no spill pattern is transmitted, a spill time slot is associated therewith. It is in this time slot that one bit of the N bit sequence is inserted each time the no-spill command is transmitted in accordance with the present invention.

Slight modifications may be made to the circuitry disclosed herein so that it is suitable for a system wherein the data rate is faster than the sample rate. The transmitter terminal for each channel, as shown in FIG. 2, will not require substantial changes since the status line will serve to provide an indication to Generator FS whenever it is desired that an extra data bit be placed in the separate channel. In response thereto, Generator FS will insert a spill code into the data stream instead of a frame pattern. Consequently, each frame will include data bits preceded by either a no spill code or by a spill code. The spill time slot associated with a spill code in each frame will include a data bit and this should not be inhibited at the receiver, whereas the spill time slot associated with each no-spill code will not include a data bit.

Instead, it is this time slot that receives one bit of the N bit sequence provided by Sequence Generator SG-1 of FIG. 2. Consequently, whenever Multiplexer M interrogates Generator FS of FIG. 2 to obtain a no spill code, it also actuates the spill command Generator SC so that a data bit is inhibited from being read out of the Elastic Store 10, and instead one bit of the N bit sequence is inserted in the spill bit time slot from the Sequence Generator SG-1 in the manner described in detail hereinbefore with respect to the operation which ensues when the data rate is slower than the sample rate.

The receiver shown in FIG. 3 represents a typical receiving terminal for an asynchronous multiplex system wherein the data rate is slower than the sample clock rate. If, however, such a system is used where the data rate is faster than the sample clock rate, then clock signals obtained from the Delay Generator D should be representative of the detection of a spill code rather than a stuff code. This is illustrated herein by an electronically operated switch 200 which, as previously mentioned, serves to isolate the Stuff Code Detector SC from the circuitry, and to substitute therefor a Spill Code Detector 202.

With reference to FIG. 4A, the N bit Shift Register 54 and the Sequence Generator SG-2 will be clocked by the no spill clock pulses obtained from the Delay Generator D in FIG. 3. Otherwise the operation of the circuitry shown is the same as that described previously with respect to a system wherein the data rate is less than the multiplex sample clock rate.

Referring now to FIG. 4B, slight modifications may be made in the Bit Integrity and Corrector Circuit BC. Thus, for each count of 7 or less in the Sequence Position Counter SPC, a data bit is added for each clock pulse rather than the opposite condition described previously. Similarly, a data bit is deleted for each count up operation of the Position Counter SPC when the count is 8 or more. This may be accomplished by reversing the connections from the up-down Decoder 80 to flip-flops 93 and 102. For purposes of simplicity of explanation herein, there is illustrated a two pole, double throw switch 210 for switching these connections between that as described hereinbefore to the condition wherein the up output terminal of decoder 80 is connected to the set terminal of flip-flop 93 and the down terminal of decoder 80 is connected to the set terminal of flip-flop 102.

Figure 6:
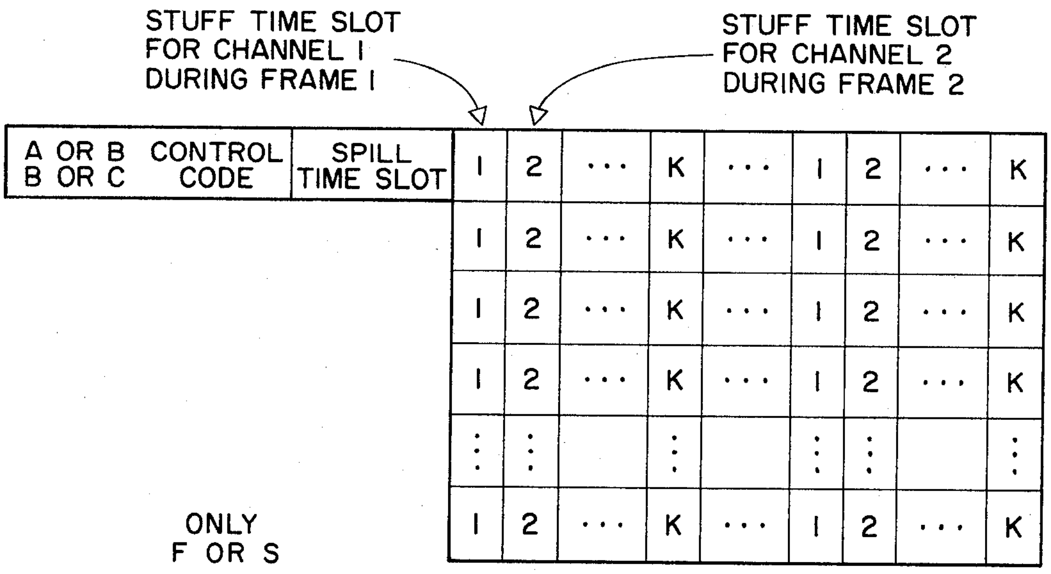
FIG. 6 is a timing diagram of a frame in which the data rate is consistently slower or faster than the sample rate, in which frame one bit of a known N bit sequence is transmitted in the spill or stuff time slots when the time slots do not carry data.

FIG. 6 is a general timing diagram for an asynchronous multiplexer in which the data rate is always either faster or slower than the channel sample rate.

Figure 7:
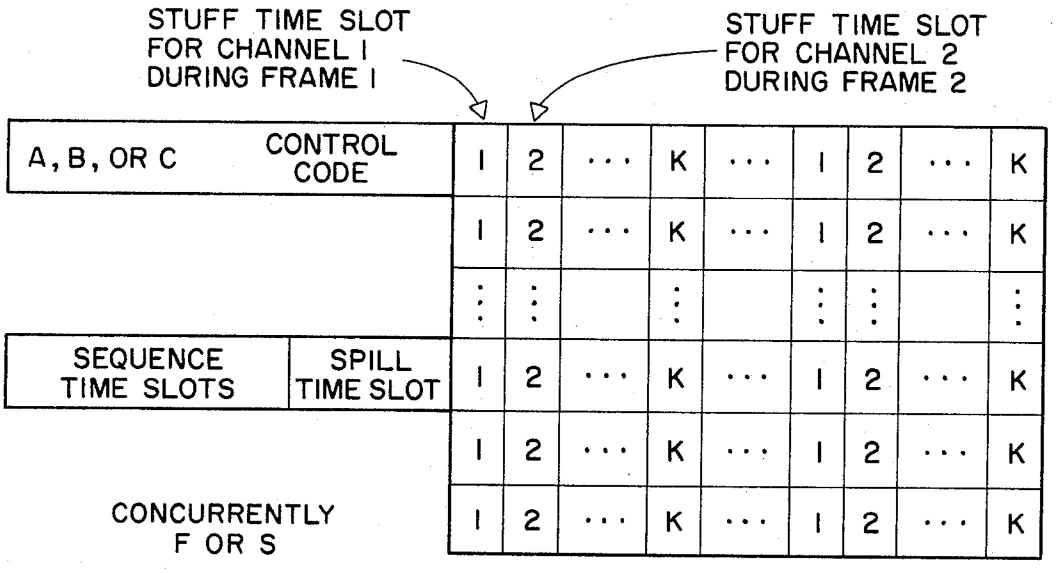
FIG. 7 is a timing diagram of a frame in which, in accordance with this invention, the data rate may be interchangeably slower or faster than the sample rate, with the sequence time slots providing a means for transmitting greater than 50 percent of the N bit sequence inasmuch as the transmitted phase may be shifted in either the positive or the negative direction.

For a system in accordance with this invention in which the data rate may be interchangeably faster or slower than the channel sample rate, a timing diagram similar to that shown in FIG. 7 is applicable. The system employs three control codes, designated A, B, and C, representing spill, no action, and stuff, respectively, and provides sequence time slots that would be used to transmit (N+1)/2 to N bits of the sequence. In a system in which a minimum of (N+1)/2 bits of a N bit sequence are transmitted, counter 58 in the receiver would not be required. Counter 58 (FIG. 4A) is required in systems which transmit only one bit of sequence, with each control code to allow errors to propagate through shift register 54. When greater than 50 percent of the N bits of the sequence are transmitted, the search for alignment can start after the next reception of a control code for that channel as all the data stored in shift register 54 in new data. For the sake of simplicity, the entire sequence will be regarded as transmitted each time a control code is transmitted.

Each time the spill code is transmitted, the sequence will be shifted back one bit, each time a no-action code is transmitted, no shift in the sequence will occur, and each time a stuff code is transmitted, the sequence will be shifted forward one bit.

A 15 bit sequence showing the relationship between the preceding sequence transmission and the sequence to be transmitted is as follows:

| | |
|---|---|
| Preceding transmission | 111100010011010 |
| Spill | 111000100110101 |
| No-Action | 111100010011010 |
| Stuff | 011110001001101 |

With the exceptions stated above, the operation for a system in which the data rate may be interchangeably faster or slower than the sample rate is identical to the previous discussion of a system in which the data rate was slower than the sample rate.

It will now be apparent that the invention described herein may be employed for applications wherein the data rate is either slower or faster than the multiplex sample rate, or interchangeably slower or faster than the multiplex sample rate. The transmitter arrangement in accordance with this invention serves to transmit a control code having associated therewith a predetermined stuff and/or spill time slot(s). The control code may be considered as a stuff code when the sample rate is greater than the data rate, or it may be considered as a spill code when the sample rate is less than the data rate.

As disclosed, the transmitter of FIG. 2 employs a Sequence Generator SG-1 which serves to insert into each of its associated stuff time slots, one of K known bit patterns respectively associated with its transmitted control codes. At the receiver, as illustrated in FIGS. 3, 4A and 4B, the control codes and the bit patterns are received. An N bit Sequence Generator SG-2 serves to sequentially generate the known bit pattern in an exact same sequence as that inserted into its associated stuff time slots in response to successive detections of the received control codes. An N bit Comparator 52 serves to compare the detected stuff code's associated bit pattern with that generated in response to the detection of the control code and to provide an output misalignment indication in the form of a No Comparison signal $\overline{C}$ when the patterns differ.

In the description of the embodiment disclosed herein, one bit of the N bit sequence has been inserted into the data stream for each stuff operation. Consequently, the bit deletion or bit addition function for each count in counter SPC has been with respect to a single bit. The number of bits deleted or added will vary in dependence upon the number of dummy or stuff bits inserted in the dummy bit time slot at the transmitting signal.

Figure 8:
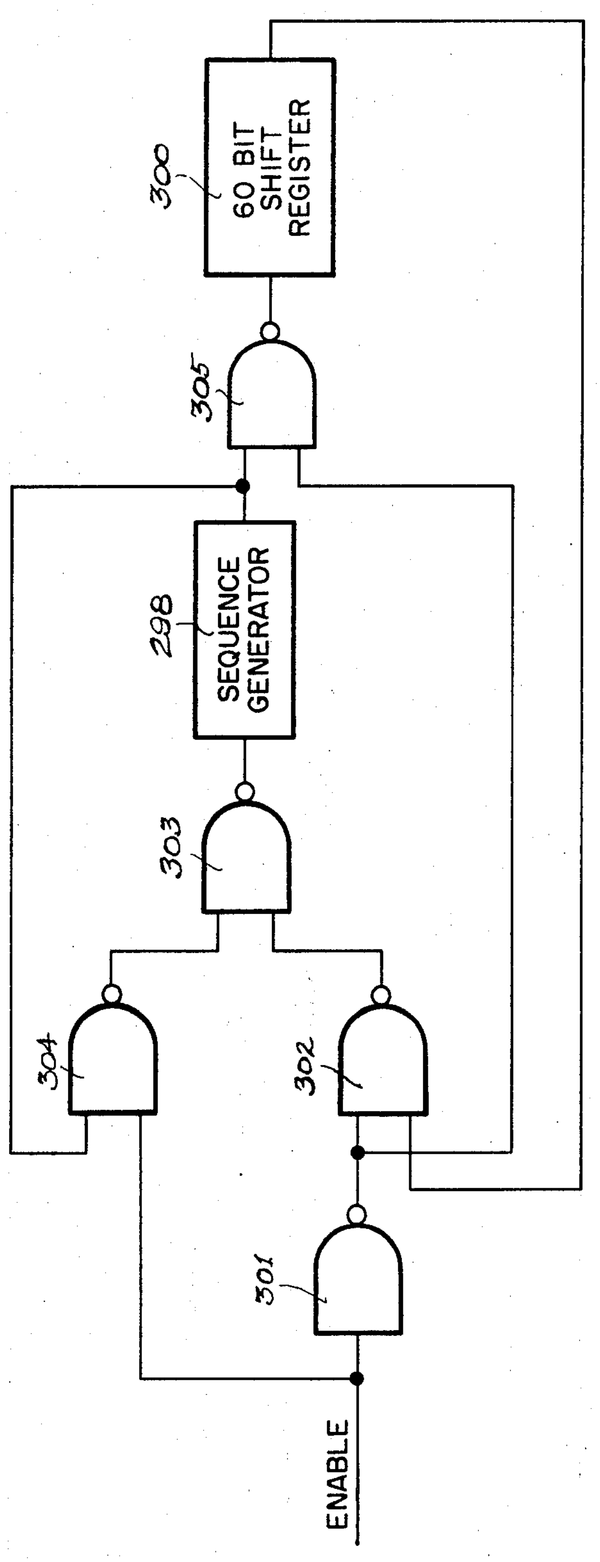
FIG. 8 is a digital storage arrangement enabling many channels to utilize on a time-shared basis, the circuitry in accordance with this invention.

Turning to FIG. 8, it will be seen that this is a general illustration setting forth time sharing of functions. Assuming sixteen channels and a 15 bit pseudo random Sequence Generator 298, knowledge of any four consecutive bits of the sequence will enable the remaining 11 bits of the sequence to be known. Storage is provided in a 60 Bit Shift Register 300 for each of the 16 channels, such that the last four bits of the 15 bit sequence are stored in this device. When a channel is not being acted upon, the last four bits of that channel's sequence are placed in storage until it is time to act upon that channel.

When the Enable input to gate 301 is low, the output of the 60 Bit Shift Register 300 is enabled through gate 302 to load the Sequence Generator 298 through gate 303, and the output of the Sequence Generator is enabled through gate 305 to store the last four bits of the sequence in the Shift Register 300. When the four bits are loaded from Shift Register 300, and when the last four bits of the sequence are loaded into the 60 Bit Shift Register for storage, the Enable line goes high, which in turn inhibits inputs from the Shift Register into the gate 302 and thereby inhibits the inputs from the Sequence Generator to the Shift Register and enables the output of the Sequence Generator to be fed back to its input by gates 304 and 303.

Two Sequence Generators, one in the transmitter and one in the receiver, and two 60 Bit Shift Registers, one in the transmitter and one in the receiver, enable all 16 channels to share the same circuitry shown in FIGs. 2, 3, 4A and 4B, previously discussed in detail.

As an example of the operation of my device, if in a given channel a stuff code is transmitted and a no action code is detected, there is an excess number of bits.

Corrective Action — delete one bit

If a no action code is transmitted and a stuff code is detected, there is a depletion.

Corrective Action — add one bit

If a spill code is transmitted and a no action code is detected, there is a depletion.

Corrective Action — add one bit

If a no action code is transmitted, and a spill code is detected, then there is an excess number of bits.

Corrective Action — delete one bit

If a stuff is transmitted, but a spill is detected, then there is an excess number of bits.

Corrective Action — delete two bits.

If a spill is transmitted and stuff is detected, then there is a depletion.

Corrective Action — add two bits

As should now be apparent, the device looks for a misalignment between the received sequence and the local sequence. It is this misalignment that reveals what corrective action, such as adding data bits or deleting data bits, that may be appropriate.

I claim:

1. In an asynchronous multiplex-demultiplex system in which there are provided means for transmitting a control code for each channel of the system, and for each transmitted control code, there are provided one or more associated sequence time slots in the transmitted data stream, the improvement comprising:

means for inserting into each of said associated sequence time slots, at least one bit of a known N bit sequence respectively associated with K transmitted control codes; and means for receiving said control codes and said N bit sequences and including means for locally generating one of K known N bit sequences in the same sequence as that inserted into said sequence time slots in response to successive detections of said received control codes, and means for comparing each detected control code'a associated N bit sequence with that generated in response to the detection of said control code and providing an output misalignment indication when said sequences differ.

2. The system as defined in claim 1 wherein said control codes are controlled by the relation existing between the channel sample rate and the input data rate on a per channel basis.

3. The system as defined in claim 2 in which the channel sample rate can be faster than, slower than, or interchangeably faster and slower than the input data rate.

4. The system as defined in claim 1 in which means are provided for utilizing said control codes to control the phase of the transmitted sequence, the phase of the transmitted sequence providing an absolute relative count on the type of control code transmitted.

5. The system as defined in claim 4 in which means are provided at the receiver means for ascertaining the phase relation between the received sequence and the locally generated sequence, with such phase information revealing whether the received control codes are the same as those transmitted, and means for interpreting any misalignment of the control codes.

6. The system as defined in claim 5 in which means are provided at the receiver for determining the phase misalignment, with the direction of the misalignment indicating the type of error made, and the magnitude of the phase misalignment indicating the number of errors made, and means for enabling channel data bits to be added or deleted as necessary to restore bit count integrity.

7. In an asynchronous multiplex-demultiplex system in which there are provided means for transmitting a control code, and for each transmitted control code, there is provided an associated predetermined sequence time slot in the transmitted data stream, the improvement comprising:

means for inserting into each of said associated sequence time slots, one of N known sequences respectively associated with K transmitted control codes, means for controlling the phase of the known sequence by means of the control code being transmitted, and means for receiving said control codes and said sequences and including means for locally generating one of N known sequences in an exact same sequence as that inserted into said sequence time slots in response to successive detections of said K received control codes, and means for comparing each detected control code's associated sequence with that generated in response to the detection of said control code and providing an output misalignment indication when said sequences differ.

8. The system as defined in claim 7 in which said control codes are controlled by the relation existing between the channel sample rate and the input data rate on a per channel basis.

9. The system as defined in claim 8 in which the channel sample rate can be faster than, slower than, or interchangeably faster and slower than the input data rate.

10. The system as defined in claim 7 in which means are provided at the receiver means for ascertaining the phase relation between the received sequence and the locally generated sequence, with such phase information revealing whether the received control codes are the same as those transmitted, and means for ascertaining misalignment of the control codes.

11. The system as defined in claim 10 in which said means provided at the receiver for determining the misalignment ascertain from the direction of any misalignment, the type of error made, and from the magnitude of any misalignment, the number of errors made, and means for adding or deleting channel data bits as necessary to restore bit count integrity.

12. In an asynchronous digital multiplex-demultiplex system having a plurality of transmission channels, with each channel including means for transmitting a control code and, for each transmitted control code, one or more associated predetermined sequence time slots in the transmitted data stream, the improvement on a per channel basis comprising:

first bit pattern sequence generator means at the transmitter terminal for sequentially inserting into said transmitted data stream during the sequence time slots, K known bit patterns, with the bit patterns being respectively associated with 1 to K transmitted control codes; and the receiving terminal for each transmission channel including:

actuatable second bit pattern sequence generator means for sequentially generating an exact same sequence of bit patterns as that sequentially inserted by said first generator means;

means for sequentially actuating said second generator means in response to sequentially detected control codes received at the receiving terminal; and means for comparing each bit pattern generated by said second generating means in response to a detected said control code, with the received bit pattern associated with the detected control code providing an output misalignment indication when a said received bit pattern is not aligned with the associated generated bit pattern.

13. In a system as set forth in claim 12 including error ascertaining means responsive to a said output misalignment indication for ascertaining whether the misalignment was caused by a bit error in one of said received bit patterns, or an error in detection of a said control code.

14. In a system as set forth in claim 12 wherein said error ascertaining means includes counting means that, when activated, counts N received pulse codes and then provides an output search command signal, and alarm means for activating said counting means for the duration of a said output misalignment indication so that an output search command is provided only when a misalignment continues for a count of N received stuff codes, indicative that the misalignment was caused by an error in detection of at least one stuff code.

15. In a system as set forth in claim 14 wherein said alarm means includes a bistable control means having a normal first state, and a second state for activating said counting means for the duration of an output misalignment indication.

16. In a system as set forth in claim 15 wherein said counting means includes an N bit digital counter and gating means enabled so long as said alarm bistable control means is in its second state, for actuating said counter by one count each time a stuff code is detected at said receiving terminal.

17. In a system as set forth in claim 13 wherein said receiving terminal includes a multibit register means for receiving each said received bit pattern transmitted from said transmitting terminal, said comparing means being connected to other bit of said sequence, said second bit pattern generator means sequentially providing means and said second generator means for comparing each said received bit pattern with the bit pattern generated by said second generator means to ascertain whether said bit patterns are aligned.

18. In a system as set forth in claim 17 wherein the first said transmitted bit pattern includes at least one bit of a known multibit sequence with the successively transmitted bit pattern each including at least one sequentially providing an exact same sequence of said bit patterns so that if each transmitted stuff code is received then the respective received bit patterns and generated bit patterns should be in alignment.

19. In a system as set forth in claim 13 including control code correction means for modifying said data stream to compensate for stuff code errors, spill code errors, or no action code errors in detecting said code at said receiving terminal.

20. In a system as set forth in claim 19 wherein said control code correction means includes:

means for storing the received bit pattern resulting in a said misalignment indication; and search means for sequentially actuating said second generator means so that its sequentially generated bit patterns are compared one at a time with the stored said received bit pattern until said misalignment indication is terminated.

21. In a system as set forth in claim 20 including sequence generator counting means for counting the number of times said second generator means is actuated by said search means before said misalignment indication is terminated.

22. In a system as set forth in claim 21 including correction control means for varying the data stream by a predetermined number of bits for each count of said sequence generator counting means.

23. In a system as set forth in claim 22 wherein said correction control means includes means for adding at least one data bit to said data stream for each of certain specific counts of said sequence generator counting means.

24. In a system as set forth in claim 22 wherein said correction control means includes means for deleting at least one data bit from said data stream for each of certain other counts of said sequence generator counting means.

25. In a system as set forth in claim 22 wherein said sequence generator means is an N bit up-down counter for counting upward by one count for each actuation by said search means and wherein said correction control means includes decoding means for respectively providing a count down command or a count up command in dependence upon whether the count of said up-down counter is less than or is equal to or greater than N/2 counts.

26. In an asynchronous digital multiplex-demultiplex system having means at the transmitter terminal for inserting stuff codes into the transmitted data stream for each transmission channel so that a stuff time slot is provided in the data stream and associated with a transmitted stuff code, the improvement in a said system for preserving bit integrity between the data bits from an asynchronous data source applied to the transmitting terminal and the demultiplexed data bits at the receiving terminal, and comprising for each transmission channel:

first bit sequence generator means at the transmitting terminal responsive to each transmitted stuff code for inserting a bit pattern of a known N bit digital sequence into the associated stuff bit time slot, said generator means sequentially inserting said bit patterns for successively transmitted stuff codes so that each said bit pattern is associated with one of N said transmitted stuff codes;

and the receiving terminal includes:

means for detecting said transmitted stuff codes;

second bit sequence generator means for sequentially generating in response to successive said stuff code detections an exact same sequence of bit patterns as that sequentially inserted by said first generator means;

means for receiving the inserted said bit pattern associated with each detected stuff code; and, means for comparing the bit pattern generated in response to a detection of a stuff code with the bit pattern associated with the detected stuff code and providing an output indication when said bit patterns do not compare.

27. In a system as set forth in claim 26 wherein said receiving terminal includes error determining means controlled by a said output indication for ascertaining the number of errors made in detecting stuff codes resulting in said output indication.

28. In a system as set forth in claim 27 wherein said receiving terminal includes bit corrector means for varying the number of data bits in the data stream at said receiving terminal in dependence upon the number of said errors in detecting stuff codes so as to preserve bit integrity.

29. In a system as set forth in claim 28 wherein said error determining means includes circuit means for providing an indication as to whether a said error in detecting a stuff code was a failure to detect a stuff code or a false detection of a stuff code.

30. In a system as set forth in claim 29 wherein said circuit means includes a bit pattern sequence counter means for providing a count indication, the decimal value of which is indicative of the type of said error in detecting a stuff code.

31. A method of preserving bit integrity in an asynchronous multiplexer-demultiplexer system employing pulse stuff/spill operations and comprising the steps of:

inserting a control code in the transmitted data stream so that one or more sequence time slots are associated with the control code, for each transmitted control code, inserting at least one bit of a known digital sequence in the associated sequence time slot, with the phase of the sequence being controllable, in response to each control code detected at the receiving terminal of said system, generating at least one bit of an exact same sequence as that inserted into the transmitted data stream, the phase of the transmitted sequence being controlled by the control code to be transmitted and the phase of the receiver local sequence generator being controlled by the received control code, and varying the number of data bits in the received data stream when the sequences are not aligned so as to preserve bit integrity.

32. A method as set forth in claim 31 wherein the number of data bits to be varied in the received data stream is dependent upon the magnitude of the misalignment between the received sequence and the local sequence.

33. A method as set forth in claim 32 wherein a given number of data bits are added to the received data stream or a given number of data bits are deleted from the received data stream in dependence upon whether the number of times in a given number of operations that said sequences do not compare is above or below a given count number.

* * * * *